J. C. CHESNEY.
Evaporating Pan.
No. 40,908. Patented Dec. 15, 1863.
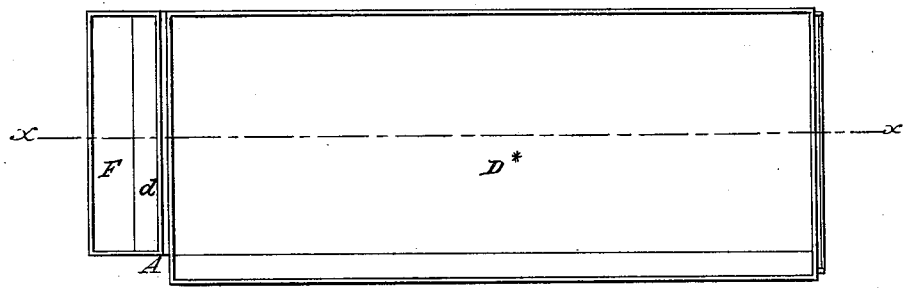
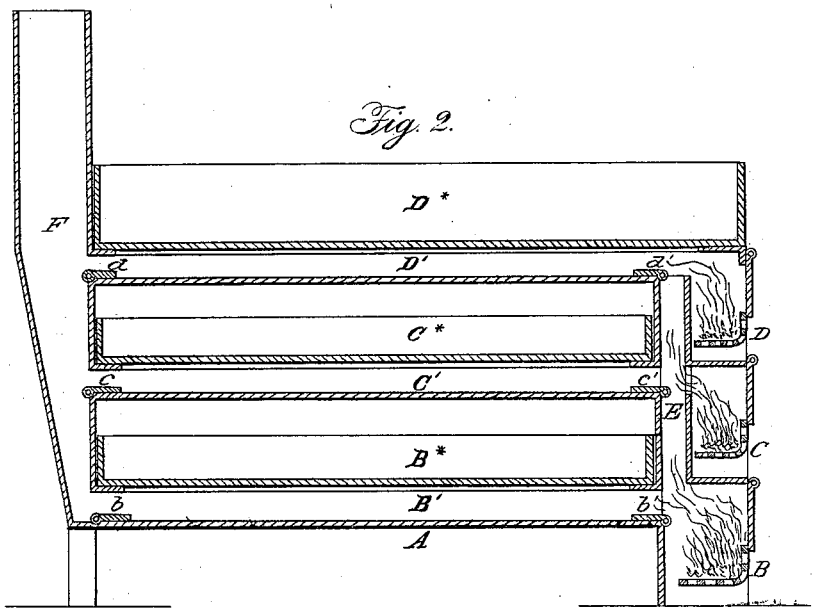
Witnesses:
Jno Coombs
Geo. W. Reed
Inventor:
J. C. Chesney
per Munn & Co
Attys

UNITED STATES PATENT OFFICE.

J. C. CHESNEY, OF ABINGDON, ILLINOIS.

IMPROVED EVAPORATOR FOR SACCHARINE LIQUIDS.

Specification forming part of Letters Patent No. 40,908, dated December 15, 1863.

*To all whom it may concern:*

Be it known that I, J. C. CHESNEY, of Abingdon, in the county of Knox and State of Illinois, have invented a new and Improved Evaporator for Saccharine Liquids; and I do hereby declare that the following is a full, clear, and exact description of the same, reference being had to the accompanying drawings, forming a part of this specification, in which—

Figure 1 represents a plan or top view of my invention. Fig. 2 is a longitudinal vertical section of the same, the line $x\ x$, Fig. 1, indicating the plane of section.

Similar letters of reference in both views indicate corresponding parts.

This invention consists in the employment or use of two or more pans placed one above the other, in combination with two or more furnaces or fire-places, suitable flues, and dampers in such a manner that the heat from the first or lowest fire can be made to strike the first pan or turned off from that pan, and made to strike the second pan or any other pan or pans above the first, and the heat from the second fire can be made to strike the second or any other pan or pans above, &c., and consequently the second pan can be exposed to the combined heat of the first and second fires, the third pan to the combined heat of the first, second, and third, or of the second and third fires, and so on, and thereby the heat of each pan can be graduated to any desired extent and the evaporation of the juice effected in a short time with comparatively little fuel and labor and in the best possible manner.

To enable those skilled in the art to make and use my invention, I will proceed to describe it.

A represents a furnace built up of sheet or cast iron or any suitable material, and provided with three fire-places, B C D, situated one above the other, as clearly shown in Fig. 2 of the drawings. The products of combustion from the lowest fire pass off through a horizontal flue, B′, or through the vertical flue E, or through both simultaneously, those of the second fire through the horizontal flue C′, or through the vertical flue E, or both, and those of the third fire through the horizontal flue D′. The vertical flue E extends upon the inside of the fire-places and it terminates in the horizontal flue D′. The horizontal flues B′ C′ D′ extend from the several fire-places to the common chimney F, through which the products of combustion escape in the open atmosphere. The space between the vertical flue E and chimney F on the top of the flue B′ is occupied by the lowest pan, B*, the corresponding space on the top of the second flue, C′, by the pan C*, and the top flue, D′, is covered by the pan D*. The pans B* and C* can be readily introduced over the flues and removed therefrom through the open sides of the furnace, and if the bottoms of the flues C′ and D′ are made of sheet metal the contents of the pans below are exposed to the heat radiating from said bottoms, besides that to which said pans are exposed from below, and the heating is effected with a comparatively small expenditure of fuel in a short time.

The heat to which the several pans are exposed is regulated by a series of dampers at the ends of the flues B′ C′ D′. The dampers $b\ b'$ at the ends of the flue B′ serve to turn off the heat from the bottom of the lowest pan, the dampers $c\ c'$ at the ends of the second flue, C′, serve to turn off the heat from the bottom of the pan C*, and, finally, the dampers $d\ d'$ serve to turn off the heat from the bottom of the pan D*.

By turning the damper $c'$ up in a vertical position the flue C′ is closed, and the products of combustion from the fires B C pass up through the vertical flue E to the flue D′; but by reversing the position of the damper $c'$ the flue E is closed and the products of combustion from the lowest fire are compelled to pass through the flue B′. In the same manner by means of the damper $d'$ the flue D′ or the flue E can be closed, and the course of the products of combustion from the fires below can be changed accordingly. Each of the dampers $c'\ d'$ admits of three positions—viz., vertical, back, and forward—and each of the other dampers can be set in a vertical and in a horizontal position. Either of the two lower pans can be removed and the dampers at the ends of their flues turned up, so that the draft is not at all decreased under the other pans. The damper next the top fire-place can be turned up and the top pan exposed but partly to the fire—namely, that part only which is directly above the fire—and so the juice in the top pan can be easily kept below the boilingpoint, or at that temperature which is best adapted to raise all impurities. By these means the contents of the several pans can be exposed to a greater or smaller heat at pleasure, and the temperature of each pan can be regulated to suit circumstances.

By the application of suitable stop cocks or faucets the juice from the pan or pans above can be let down in the pan or pans below, and the evaporation of the juice can be effected in the most expeditious manner with a comparatively small amount of fuel, and by slight attention all danger of burning the juice is obviated, and an article is produced of superior quality.

What I claim as new, and desire to secure by Letters Patent, is—

The employment or use of a furnace, A, with two or more fire-places, B C, one above the other, in combination with a vertical flue, E, two or more horizontal flues, B' C', and suitable pans, B* C*, and dampers $b'$ $c'$, all constructed and operating in the manner and for the purpose substantially as shown and described.

J. C. CHESNEY.

Witnesses:
D. W. ANDREWS,
G. F. ANDREWS.